UNITED STATES PATENT OFFICE 2,390,210

FORTIFICATION OF RICE

Ernest A. Fieger and Virginia R. Williams, Baton Rouge, La., assignors to Board of Supervisors of Louisiana State University and Agricultural and Mechanical College, Baton Rouge, La.

No Drawing. Application March 8, 1944, Serial No. 525,598

7 Claims. (Cl. 99—11)

It is well recognized that there are highly desirable vitamins in the bran coats and germ of rice, but substantially none in the milled grains. "Milled" as used herein means that the bran coats and germs of the rice grains have been removed but the grains have not been ground or crushed to flour or meal form. Therefore milled or polished rice is substantially devoid of vitamins. Various efforts have been made to fortify milled rice with vitamins or other desirable enriching substances, but difficulties have been encountered which are not encountered in the fortifying or enriching of wheat flour and other finely divided food products.

Rice is ordinarily sold in the form of grains, and not in powder form as flour or meal, and therefore in fortifying it is necessary to apply the enriching material to the surface of the milled grains, or to absorb it within the grains. It is common practice of cooks to wash or rinse rice before cooking, and therefore the application of water-soluble enriching materials to the surface of the grains is of little use, because it is largely or entirely washed off in the ordinary rinsing of the grains before cooking. Impregnating the grains with a solution of the enriching material, and then drying them, has not resulted in a satisfactory product, because the grains become checked, cracked, disintegrated or broken, so that upon cooking the grains become soft and sticky, and adhere in a solid mass rather than remaining in discrete grains. Also there is developed an opaque or dead white appearance which is not acceptable to the rice trade or rice consumer. Upon drying, the enriching material diffuses to the surface and is largely washed off in the rinsing.

We have discovered a procedure whereby milled rice grains may have incorporated therein the desired enriching materials without checking, cracking or breaking the grains, without change in appearance, and without loss of such material during rinsing.

As one important feature of our improved process the water-soluble enriching material is applied in a concentrated salt solution, whereupon the grains do not check, crack or break, and the development of opacity is prevented.

As a further feature, the grains after having the enriching material incorporated therein and being dried, are coated with a film which acts as a dialysis membrane, and which is not soluble in water, so that it protects and retains the enriching material during washing or rinsing of the grains. The film also protects the grains during packaging and handling. During cooking, hot water diffuses through the membrane and the grains swell to rupture the protecting film so that it does not prevent them from being cooked in the same time and in the same manner as ordinarily milled rice. The fortified or enriched grains are similar in appearance to ordinary milled rice, and the fortifying or enriching material is retained in the grains until the time they are cooked.

In carrying out our improved process the milled rice is treated or soaked in a concentrated solution of a very soluble salt in which is dissolved the enriching or fortifying material. If the concentrated salt solution is not used, the water of the solution of the enriching material acts to hydrate the starch grains, with a resulting cracking or checking, but by using the concentrated salt solution the high osmotic pressure greatly reduces the imbibing or hydration of the starch grains, and checking or cracking, and the development of opacity, are prevented.

After soaking or treating the grains for the proper length of time in the solution of salt and enriching material, the grains are separated from the solution in any suitable manner, as for instance by basket centrifuging or by suction filtration. The grains are then dried at room temperature in contact with air. The dried, fortified milled rice is then treated with a solution of a cellulosic or similar material which can be dried to a very thin film upon the evaporation of the solvent. This film or coating prevents the loss of the enriching or other water-soluble substance during handling, packaging, rinsing and similar treatment.

By the use of our improved process milled or polished rice of high vitamin potency can be prepared and can then be mixed or blended with unfortified milled rice to give a product of any desired potency or concentration, within reasonable limits.

The following are examples of procedures which may be employed in carrying out our improved process:

1 pound of milled rice is placed in 1 gallon of a solution containing 8 pounds 3 ounces of sodium dihydrogen phosphate and 3 ounces of thiamin. After remaining in the solution for 15 minutes, the rice is centrifuged in a basket centrifuge at low speed for 1 minute. The speed is then considerably increased, and the grains are spun for 1 additional minute. Instead of centrifuging, the rice and the solution may be separated by suction filtration.

A saturated solution of sodium dihydrogen phosphate contains 1.1 pounds per pound of water. In the above example the solution contains 1.00 pound of phosphate and thiamin per pound of water which amounts to 90.9% of that required for a saturated solution. We have discovered that a concentration of 75% or less results in excessive checking. To prevent checking the concentration should be such that the dissolved materials (phosphate plus vitamins) are equal to at least 90% of the weight of the water, and higher concentrations are more desirable. By using such high concentration, the osmotic pressure of the solution counteracts the effect of imbibition pressure of the starch in the rice grains, and the vitamins pass into the rice grains without sufficient water entering the starch to cause swelling of the starch and consequent checking and cracking of the grains.

The rice is then spread out in a thin layer to dry, which may require from 15 to 20 hours. The dried, fortified rice is then moistened with a solution of cellulose nitrate, made by dissolving 1 pound of cellulose nitrate in 2 pounds of ethyl ether and 2 pounds of ethyl alcohol, and immediately centrifuged to remove the excess solution. Here again the excess liquid may be removed by suction filtration instead of by centrifuging. After separation of the treated rice from excess liquid, the rice is spread in a thin layer and permitted to remain until the solvent has evaporated.

Fortified or enriched rice prepared as above will contain approximately 400 micrograms of thiamin per gram of rice. The 1 pound of rice prepared as above described is mixed thoroughly with 99 pounds of unfortified milled rice, and the resultant product will have an average composition of 4 micrograms of thiamin per gram of rice, which is substantially the same amount of thiamin as is present in brown or unmilled rice. Thus, to get the desired enrichment of a given quantity of rice, it is necessary to process only 1% of the total quantity.

By varying the ratio or proportions of treated rice to the untreated milled rice, a fortified or enriched rice containing a greater or lesser average thiamin content may be prepared.

Sodium dihydrogen phosphate is only one of many salts which may be used in the solution containing the vitamin or other enriching material, and the amount of salt used will vary with the solubility of the salt. If ammonium sulfate be used instead of sodium dihydrogen phosphate, the concentrated solution may be made by using 8 pounds 3 ounces per gallon of water, which is equivalent to 0.98 pound of ammonium sulphate per pound of water, but if sodium citrate be used, a satisfactory concentration is obtained by using 7 pounds 6 ounces per gallon of water which is equivalent to 0.88 pound per pound of water.

Among the various other salts which are satisfactory are the following: secondary ammonium citrate, tertiary and secondary potassium citrate, tertiary sodium citrate, ammonium lactate, sodium lactate, ammonium sulfate, ammonium acid sulfate, ammonium chloride, ammonium potassium tartrate, potassium sodium tartrate, secondary potassium phosphate, and potassium acetate.

It is desirable that salts exhibiting basic reactions in solution should not ordinarily be used, because they are liable to develop a yellow color in the grains, and it is desirable to employ very soluble salts such as those of ammonium, sodium and potassium.

Instead of using cellulose nitrate, various other film forming materials may be used, for instance cellulose acetate or other cellulose esters, or similar materials which will form a thin water-insoluble non-toxic film or coating.

The product produced by the use of our improved process is not readily distinguishable in appearance from ordinary milled or polished rice. It retains its vitamin content during handling, packaging, shipping and retailing. The rice is protected from any adverse effect of moist atmosphere, and retains its vitamin content during ordinary washing or rinsing prior to cooking.

Although thiamin is one of the vitamins present in brown or unmilled rice, and is the vitamin referred to in the above examples, it will be obvious that any other suitable water-soluble vitamin or B-complex vitamins, or any other enriching or fortifying material or mixture of materials which may be desired in the rice, may be used in carrying out our improved process, and by a single soaking in a solution containing one or as many as may be desired of them.

Having thus described our invention, what we claim as new and desire to secure by Letters Patent is:

1. The process of fortifying milled rice grains while preventing the development of opacity and the checking, cracking or breaking of the grains, which includes subjecting said grains to the action of a water solution of a fortifying agent and a salt in an amount equal to at least 90% of saturation, and then drying the grains.

2. The process of fortifying milled rice grains while preventing the development of opacity and the checking, cracking or breaking of the grains, which includes subjecting said grains to the action of a water solution of a vitamin and a salt in an amount equal to at least 90% of saturation, and then drying the grains.

3. The process of fortifying milled rice grains while preventing the development of opacity and the checking, cracking or breaking of the grains, which includes subjecting said grains to the action of a water solution of B-complex vitamins and a salt in an amount equal to at least 90% of saturation, and then drying the grains.

4. The process of fortifying milled rice grains, which includes subjecting the grains to the action of a water solution of a fortifying agent and a salt in an amount equal to at least 90% of saturation, drying the grains, and coating them with a water-insoluble film.

5. The process of fortifying milled rice grains, which includes subjecting the grains to the action of a water solution of a fortifying agent and a salt in an amount equal to at least 90% of saturation, drying the grains, and coating them with a dialysis membrane.

6. The process of fortifying milled rice grains, which includes subjecting them to the action of a water solution containing at least 90% by weight of a salt and a fortifying agent, drying the grains, and coating them with a water-insoluble film.

7. The process of fortifying milled rice grains, which includes subjecting them to the action of a water solution containing at least 90% by weight of a salt and a fortifying agent, drying the grains, and coating them with a dialysis membrane.

ERNEST A. FIEGER.
VIRGINIA R. WILLIAMS.